(12) United States Patent
Schallmeier

(10) Patent No.: US 9,272,596 B2
(45) Date of Patent: Mar. 1, 2016

(54) GPS ACTIVATED PARK MODE FOR ADJUSTABLE SUSPENSION SYSTEMS

(71) Applicant: Continental Automotive System, Inc., Auburn Hills, MI (US)

(72) Inventor: Christian Schallmeier, Lake Orion, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 14/309,457

(22) Filed: Jun. 19, 2014

(65) Prior Publication Data

US 2014/0379214 A1    Dec. 25, 2014

Related U.S. Application Data

(60) Provisional application No. 61/837,822, filed on Jun. 21, 2013.

(51) Int. Cl.
| | |
|---|---|
| *B60G 17/00* | (2006.01) |
| *B60P 1/00* | (2006.01) |
| *B60G 17/016* | (2006.01) |
| *B60G 17/019* | (2006.01) |
| *B60G 17/04* | (2006.01) |
| *B60G 17/015* | (2006.01) |

(52) U.S. Cl.
CPC ............ *B60G 17/016* (2013.01); *B60G 17/019* (2013.01); *B60G 17/0155* (2013.01); *B60G 17/01933* (2013.01); *B60G 17/04* (2013.01); *B60G 2400/204* (2013.01); *B60G 2401/16* (2013.01); *B60G 2500/30* (2013.01); *B60G 2800/20* (2013.01); *B60G 2800/914* (2013.01)

(58) Field of Classification Search
USPC ............................... 701/36–37, 400, 412, 426
See application file for complete search history.

(56) References Cited

U.S. PATENT DOCUMENTS

| | | | |
|---|---|---|---|
| 2005/0021205 A1 | 1/2005 | Niwa et al. | |
| 2006/0229811 A1* | 10/2006 | Herman et al. | 701/213 |
| 2008/0178576 A1* | 7/2008 | Meier et al. | 60/277 |
| 2010/0057356 A1* | 3/2010 | Lin | 701/209 |
| 2010/0174452 A1* | 7/2010 | Leinung | 701/38 |
| 2011/0037579 A1* | 2/2011 | Lesesky | 340/431 |
| 2014/0244110 A1* | 8/2014 | Tharaldson et al. | 701/36 |
| 2015/0019125 A1* | 1/2015 | Mazanec | 701/410 |

FOREIGN PATENT DOCUMENTS

| | | |
|---|---|---|
| WO | 2006071169 A1 | 7/2006 |
| WO | 2006135326 A1 | 12/2006 |

OTHER PUBLICATIONS

European Search Report dated Mar. 24, 2015.

* cited by examiner

*Primary Examiner* — Yonel Beaulieu

(57) ABSTRACT

A method of adjusting an air suspension system comprises detecting with a positioning system that the vehicle is approaching a park location and reporting the park location is approaching to an electronic control unit for the air suspension system. A vehicle speed is determined and compared to a predetermined speed threshold, with the electronic control unit. The electronic control unit selects a park mode for the suspensions system when the vehicle is approaching the park location and when the vehicle speed is below the predetermined threshold. Air supply for the air suspension system is controlled to adjust the corner assemblies for the air suspension system to lowered positions associated with the park mode.

14 Claims, 3 Drawing Sheets

GPS ACTIVATED PARK MODE FOR ADJUSTABLE SUSPENSION SYSTEMS

CROSS-REFERENCE TO RELATED APPLICATIONS

This disclosure claims priority to U.S. Provisional Application No. 61/837,822, which was filed on Jun. 21, 2013 and is incorporated herein by reference.

TECHNICAL FIELD

The present disclosure relates to automotive vehicles and more particularly to adjustable suspension systems for automotive vehicles.

BACKGROUND

Suspension systems for automotive vehicles provide vehicle passengers with a more comfortable ride. Demand from vehicle owners for more controls and options has led to the development of adjustable air suspension systems. Depending on the current driving surface, different suspension operating modes may be selected by the vehicle operator. The suspension operating modes have present suspension parameters to provide the ideal suspension arrangement for various driving situations. Typical operating modes a driver may select include, a standard driving mode, a snow mode, an off-roading mode, etc.

In addition to providing selected operating modes for various driving situations the suspension system may be adjusted when select operating conditions are met. For example, the vehicle height may be lowered when operating above a predetermined operating speed to obtain a better aerodynamic profile for the vehicle. Thus, adjustable air suspension systems provide a vehicle operator with a more efficient driving experience.

Cars and trucks may already have a park or easy-exit mode, where the vehicle lowers the body height in order to have a convenient ingress/egress. The park mode is typically activated by the driver, requesting this manually, e.g. button, HMI, etc. Because drivers are paying attention to surrounding conditions the request for park mode is typically initiated after the vehicle has already been parked. Once initiation the suspension adjustment may take some time until the park mode is fully reached. Thus, this feature may not always be used to its full capabilities, as drivers forget or don't bother with waiting for the vehicle to adjust to the park mode position.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

An air suspension system for a vehicle comprises four corner assemblies, wherein one corner assembly is located at a suspension position corresponding to each of the wheel corners for the vehicle and an air supply unit including a compressor, and an ECU fluidly connected to the corner assemblies. The air supply unit is capable of independently adjusting the corner assemblies from one another. The air suspension system is operable to place the corner assemblies in a park position when a positioning system indicates that the vehicle is approaching a final destination.

A method of adjusting an air suspension system comprises detecting with a positioning system that the vehicle is approaching a final destination, and selecting a park mode with an electronic control unit for the air suspension system when the vehicle is approaching the final destination. The air suspension system controls an air supply unit to move at least one front assembly and at least one rear assembly for the air suspension system to a lowered position.

A method of adjusting an air suspension system comprises detecting with a GPS unit that the vehicle is approaching a park location and reporting the vehicle is approaching the park location to an electronic control unit for the air suspension system when the vehicle is a predetermined distance from the park location. A vehicle speed is determined and compared to a predetermined or calculated speed threshold, with the electronic control unit. The electronic control unit selects a park mode for the suspensions system when the vehicle is approaching the park location and when the vehicle speed is below the predetermined threshold. Air supply for the air suspension system is controlled to adjust the corner assemblies for the air suspension system to lowered positions associated with the park mode.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
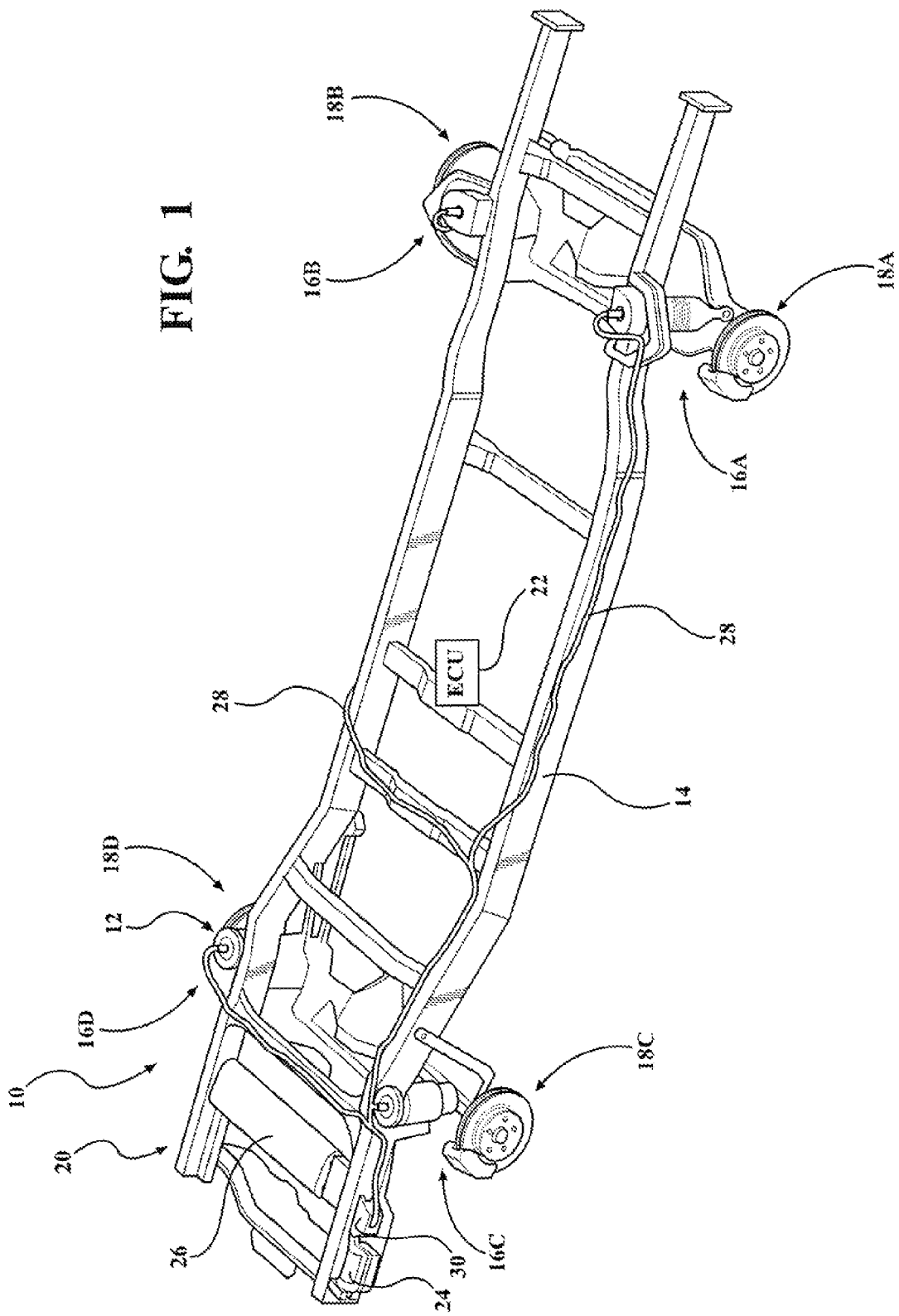
FIG. 1 is a schematic illustration of a frame for pickup truck having an air suspension system of the present invention.

The following description is merely exemplary in nature and is in no way intended to limit the disclosure, its application, or uses. For purposes of clarity, the same reference numbers will be used in the drawings to identify similar elements. FIG. 1 illustrates a vehicle, in this instance a pickup truck, 10 having an air suspension system 12. The air suspension system 12 is supported by a frame 14. The air suspensions system has four corner assemblies 16A-D located at each of the wheel 18 locations of the vehicle 10. The four corner assemblies 16A-D may be independently adjustable. Two corner assemblies 16A, B are located at the front wheel 18A, B corners of the vehicle 10 and two corner assemblies 16C, D are located at the rear wheel 18C, D corners of the vehicle.

The air suspension system 12 includes an air supply unit 20 fluidly connected to the four corner assemblies 16A-D. The air supply unit 20 includes an electronic control unit 22, a compressor 24, a reservoir 26 and a valve block 30. The individual components of the air supply unit may be assembled together or supported on the vehicle at separate locations. In the embodiment shown the ECU 22 is located remote from the compressor 24, reservoir 26 and valve block 30. The individual components of the air supply unit 20 may be assembled together or supported on the vehicle 10 at separate locations. In the embodiment shown, the ECU 22 is located remote from the compressor 24, reservoir 26 and valve block 30 (electrical connections not shown). Alternatively, the air suspensions system 12 may be an open loop system and the air supply unit may not include a reservoir 26.

The air supply unit 20 is connected to the four corner assemblies 16A-D through the supply lines 28. In the example shown, the air suspension system 12 is a closed system. The valve block 30 is controlled by the ECU 22 to regulate the air supply between the compressor 24, the reservoir 26 and the four corner assemblies 16A-D. The valve block 30 may be a single unit defining multiple valves, multiple valves located together, or multiple valves at different locations. Additionally, the reservoir 26 may be a single or multiple tank assembly.

While the embodiment disclosed has four corner assemblies 16A-D, the suspension system 12 may also be a system where the front and rear axle are separately adjustable, and does not necessarily require separate adjustment at each of the corner assemblies 16A-D. Therefore, the present invention may be used with any vehicle 10 that has an adjustable suspension system 12 having a park assist mode 35.

The four corner assemblies 16A-D are adjustable to accommodate various driving conditions. Based upon the selected suspension mode the ECU 22 will regulate the air supply between the compressor 24, reservoir 26 and the four corner assemblies 16A-D to adjust the four corner assemblies 16A-D from the current positions to the desired positions. When lowering any of the corner assemblies 16A-D the excess air is sent to the reservoir 26 for storage. When raising any of the corner assemblies 16A-D the required air is sent from the reservoir 26 to the appropriate corner assembly 16A-D. The compressor 24 ensures that the air pressure within the system 12 is maintained at the desired level. Alternately, in the instance of an open system the excess air is released to the environment or pulled from the environment and pressurized as needed. The compressor 24 ensures that the air pressure within the system 12 is maintained at the desired level.

The air suspension system 12 is adjusted at the direction of the vehicle operator by moving a selector, or when pre-determined operating conditions exist, e.g. the vehicle 10 accelerates above a certain speed and the suspension system 12 is lowered, when the vehicle 10 decelerates below a predetermined threshold the suspension system 12 raised. Therefore, the air suspension system 12 may be adjusted while the vehicle 10 is in motion. In this instance, the front corner assemblies 16A, B may be adjustable together and the rear corner assemblies 16C, D may be adjustable together. To provide the most aerodynamic adjustment possible, when the vehicle is travelling in a forward direction, the rear corner assemblies are adjusted to the new position first when the suspension system 12 is raised. However, when the suspension system 12 is lowered, the front corner assemblies 16A, B are adjusted to the new position first. Alternately, each corner 16A-D could be adjusted separately or all corners 116A-D could be adjusted simultaneously.

Figure 2:
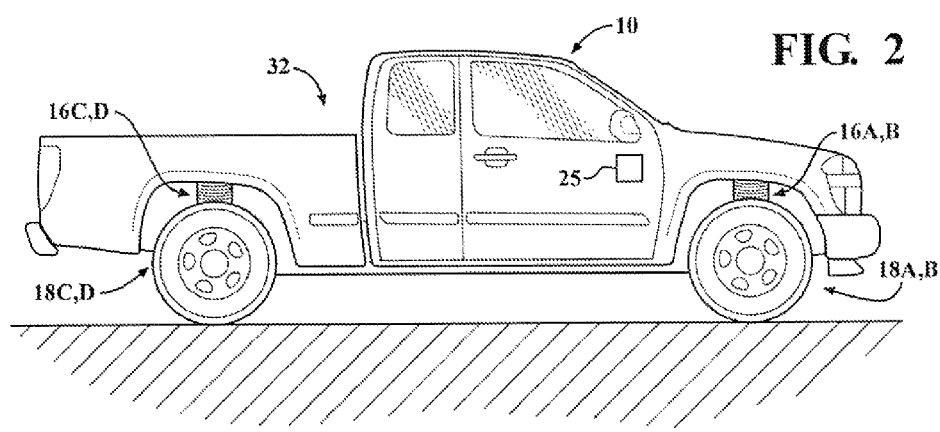
FIG. 2 is a schematic illustration of the pickup truck having the air suspension system of FIG. 1 in a standard drive position.
Figure 3:
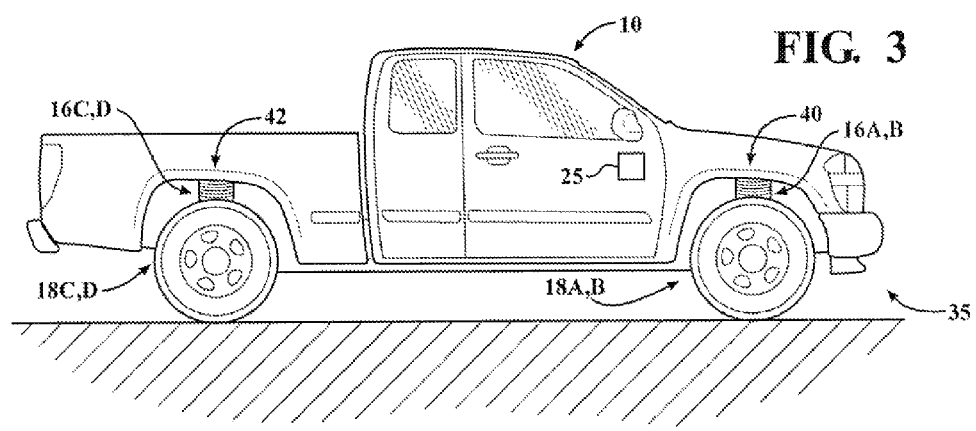
FIG. 3 is a schematic illustration of the pickup truck having the air suspension system of FIGS. 1-2 in a park position.
Figure 4:
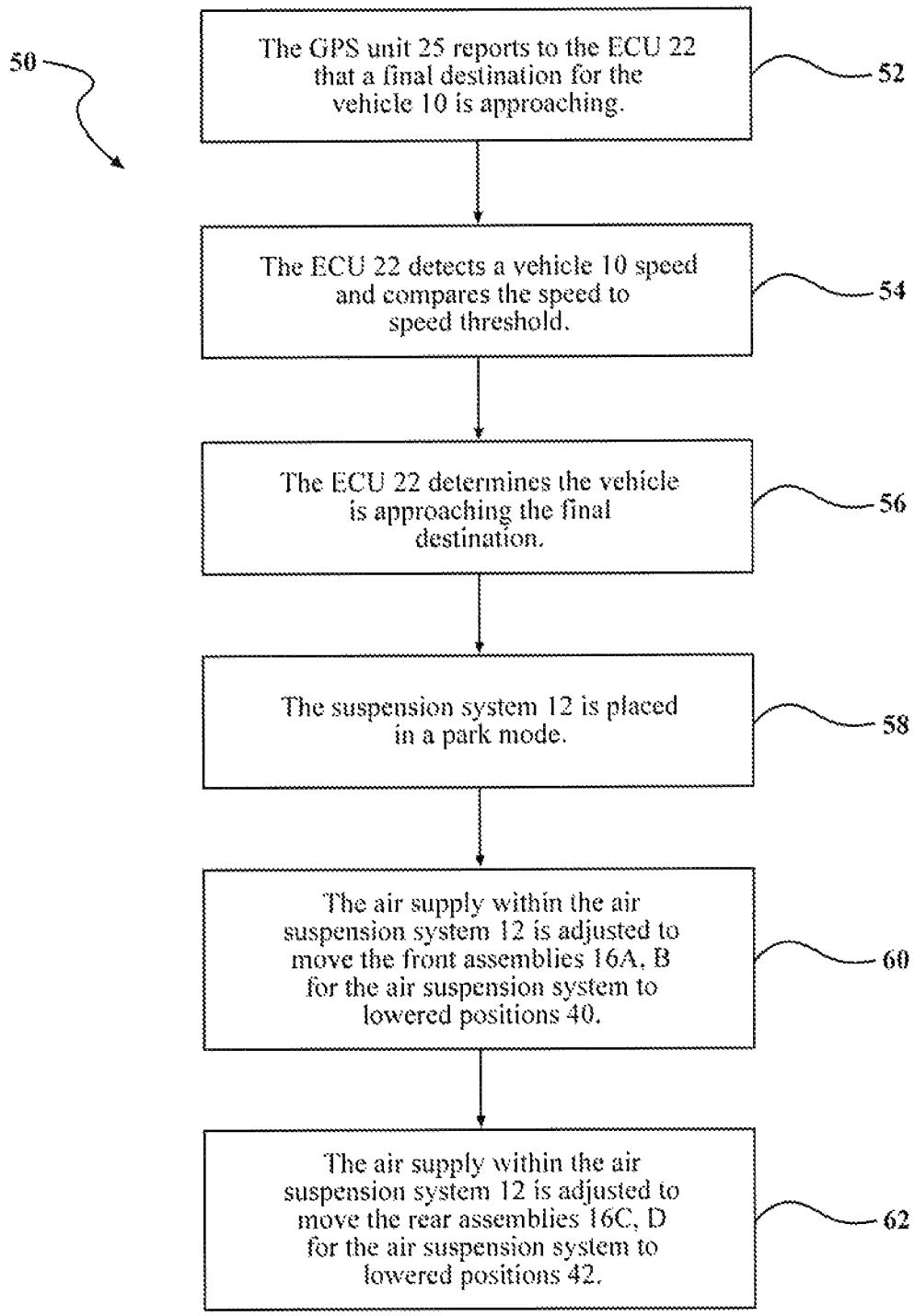
FIG. 4 is a schematic illustration of a method for adjusting the pickup truck having the air suspension system of FIGS. 1-3 to a park position.

FIGS. 2-3 are schematic illustrations of a vehicle 10 with the air suspension system 12. FIG. 2 illustrates the vehicle in a standard position 32. FIG. 3 illustrates the vehicle in a park position 35. In the park position 35, the air suspension system 12 is in a parked vehicle position corresponding to a lowering of the vehicle 10 height. Moving the vehicle 10 to the park position 35 is likely a two step process. The front corner assemblies 16A, B are moved together and the rear corner assemblies 16C, D are moved together.

The present invention links the air suspension control 22 with a positioning system 25. The positioning system 25 may be an integrated, or non-integrated GPS unit, or may be another type of positioning system. In the example shown, the position system 25 is a GPS unit 25. The GPS unit 25 includes pre-defined favorite places, which are recognized by the GPS 25. The pre-defined favorite places may be manually selected by the driver, e.g. while the vehicle is in the favorite place the vehicle operator indicates to the GPS unit 25 that the current location is a favorite. Alternatively, the GPS unit 25 may recognize the location as a favorite based on history of the vehicle 10 parking in that location. Some variation may also be introduced into the favorite location to accommodate for small difference in parking location, e.g. different parking spaces within a frequently used parking lot. Once the vehicle 10 approaches such a favorite place (e.g. your driveway at home) it sends a request to the air suspension ECU 22 to lower the vehicle 10. Another option is, to add a speed dependency, to not lower down the vehicle 10 on such instances, as you only pass by a location without the intention of stopping.

The GPS unit 25 may recognize when the vehicle 10 is approaching a final destination 37. The final destination 37 may be when approaching the end of a planned route entered in the GPS unit 25, a favorite place recorded in the GPS unit 25, or a frequently visited place. The GPS unit 25 reports to the ECU 22 for the suspensions system that the vehicle is approaching a final destination. The ECU 22 may also confirm the vehicle is approaching a final destination by comparing the vehicle 10 speed to a predetermined threshold.

The signal may be sent when the vehicle 10 is a predetermined distance from the final destination, e.g. 500 ft. The predetermined distance may be selected based upon the amount of time a particular suspensions system 12 takes to move into a park mode 35 and other factors which, may include the predetermined speed threshold, or another selected speed for approximating how long it will take the vehicle to reach the final destination. One skilled in the art would be able to determine a desirable predetermined distance and predetermined speed threshold for a particular vehicle and suspension system. Alternatively, different predetermined distances may be selected for different suspensions modes, because the amount of time to move from one suspension mode into park mode may vary. In one embodiment the predetermined distance and/or predetermined threshold may be selectable by a vehicle operator.

Referring to FIGS. 1-2 one embodiment of a method of adjusting an air suspension system is described, shown at 50. The positioning system 25 reports to the ECU 22 that a final destination for the vehicle 10 is approaching, shown at 52. The ECU 22 detects a vehicle 10 speed and compares the speed to speed threshold, shown at 54. The ECU 22 may receive data from the vehicle sensors (not shown) to detect these and other conditions. Based on this information the ECU 22 determines the vehicle is approaching the final destination, shown at 56 and selects a park mode, shown at 58. The ECU 22 controls the air supply within the air suspension system to move the front assemblies for the air suspension system to lowered positions 40, shown at 60 and to move the rear assemblies to lowered positions 42, shown at 62.

The ECU 22 controls the air supply within the air suspension system 12 to move the two front corner assemblies 16A, B to the lowered positions 40 and the two rear corner to the lowered positions 42. That is, the ECU 22 directs air from the corner assemblies 16A-D to move the corner assemblies 16A-D to the lowered positions 40, 42 by adjusting the valves within the valve block 30 to control air within the fluid lines 28. The front corner assemblies 16A, B move independently of the rear corner assemblies 16C, D. The ECU 22 may control the air supply unit 20 to complete movement of one end of the air suspensions system 12 prior to moving the other end of the air suspension system 12. For example, the front corner assemblies 16A, B may be moved to the lowered positions 40 prior to controlling the air supply to move rear corner assemblies 16C, D to the lowered positions 42 when the vehicle 10 is travelling in a forward direction. Operation of the compressor 24 is also controlled by the ECU 22 to maintain air pressure within the air suspension system 12 at a desired level. Adjusting pressure within the system 12 may also be used to assist in controlling air flow to the desired location.

While the best modes for carrying out the invention have been described in detail the true scope of the disclosure should not be so limited, since those familiar with the art to which this invention relates will recognize various alternative designs and embodiments for practicing the invention within the scope of the appended claims.

What is claimed is:

1. An air suspension system for a vehicle comprising:
   four corner assemblies, wherein one corner assembly is located at a suspension position corresponding to each of the wheel corners for the vehicle;
   an air supply unit including a compressor, and an ECU connected to the corner assemblies, wherein the air supply unit is capable of independently adjusting the corner assemblies from one another; and
   wherein the air suspension system is operable to place the corner assemblies in a park position when a positioning system indicates that the vehicle is approaching a final destination and the air suspensions system is triggered to move to the park position when the vehicle is moving at a speed below a predetermined threshold speed such that the vehicle achieves the park position prior to stopping the vehicle, wherein the park position is a position lowering the vehicle to ease ingress and egress from the vehicle by a vehicle operator.

2. The air suspensions system of claim 1, wherein the positioning system is positioning system indicates that vehicle is approaching the final destination when the vehicle is approaching a location that is indicated as a favorite place in the positioning system.

3. The air suspension system of claim 1, wherein the positioning system indicates that vehicle is approaching the final destination when the vehicle is approaching the end of a planned route entered in the positioning system.

4. The air suspensions system of claim 1, wherein the positioning system indicates that vehicle is approaching the final destination when the vehicle is approaching a location that is indicated in the positioning system as a frequently visited place.

5. The air suspensions system of claim 1, wherein the positioning system indicates that vehicle is approaching the final destination when the vehicle is a predetermined distance from the final destination.

6. The air suspensions system of claim 1, wherein the positioning system is a GPS unit.

7. A method of adjusting an air suspension system comprising:
   detecting with a positioning system that the vehicle is approaching a final destination;
   determining a vehicle speed;
   comparing the vehicle speed to a predetermined speed threshold;
   selecting a park mode with an electronic control unit for the air suspension system when the vehicle is approaching the final destination, wherein the ECU selects the park mode when the vehicle is approaching the final destination and when the vehicle speed is also below the predetermined threshold and the park mode lowers the vehicle to ease ingress and egress from the vehicle by a vehicle operator;
   controlling air supply within the air suspension system to move at least one front assembly for the air suspension system to a lowered position; and
   controlling air supply within the air suspension system to move at least one rear assembly for the air suspension system to a lowered position.

8. The method of claim 6, wherein the positioning system indicates that vehicle is approaching the final destination when the vehicle is approaching a location that is indicated as a favorite place.

9. The method of claim 6, wherein the positioning system indicates that vehicle is approaching the final destination when the vehicle is approaching the end of a planned route entered.

10. The method of claim 6, wherein the GPS unit indicates that vehicle is approaching the final destination when the vehicle is approaching a location that is indicated in the positioning system as a frequently visited place.

11. The method of claim 6, wherein the GPS unit indicates that vehicle is approaching the final destination when the vehicle is a predetermined distance from the final destination.

12. A method of adjusting an air suspension system comprising:
    detecting with a GPS unit that the vehicle is approaching a park location;
    reporting that the park location is approaching to an electronic control unit for the air suspension system when the vehicle is a predetermined distance from the park location;
    determining a vehicle speed;
    comparing the vehicle speed to a predetermined speed threshold with the electronic control unit;
    selecting a park mode when the electronic control unit determines the vehicle is approaching the park location and when the vehicle speed is below the predetermined threshold, wherein the park mode lowers the vehicle to ease ingress and egress from the vehicle by a vehicle operator; and
    controlling air supply for the air suspension system to adjust the corner assemblies for the air suspension system to lowered positions associated with the park mode while the vehicle is moving at a speed below the predetermined threshold.

13. The method of claim 12, wherein the corner assemblies are adjusted to the lowered positions associated with the park mode prior to the vehicle being placed in a park gear.

14. The method of claim 12, wherein the corner assemblies are adjusted to the lowered positions associated with the park mode prior to engaging a park brake for the vehicle.

* * * * *